United States Patent
Bolotte et al.

[19]

[11] Patent Number: 6,161,589

[45] Date of Patent: Dec. 19, 2000

[54] PIPE HOLE COVERING AND SEALING TRIM

[76] Inventors: Russell Bolotte; Rodney Bolotte, both of 112 Branch Dr., Slidell, La. 70461

[21] Appl. No.: 09/365,042

[22] Filed: Jul. 30, 1999

[51] Int. Cl.[7] ........................................ F16L 3/10
[52] U.S. Cl. ................. 138/106; 138/96 R; 138/112; 138/167; 138/178
[58] Field of Search ..................... 138/109, 110, 138/106, 108, 112, 158, 162, 167, 178, 96 R, 155

[56] References Cited

U.S. PATENT DOCUMENTS

| D. 264,494 | 5/1982 | Chaps | D23/40 |
|---|---|---|---|
| 653,313 | 7/1900 | Raifsnyder | 138/96 R |
| 737,182 | 8/1903 | Webster | 138/106 |
| 1,670,241 | 5/1928 | Conner | 138/96 R |
| 2,044,568 | 6/1936 | Gunderman | 138/96 R |
| 2,404,531 | 7/1946 | Robertson | 138/106 |
| 3,605,251 | 9/1971 | Salerno et al. | 138/108 |
| 3,642,308 | 2/1972 | Zeile, Jr. et al. | 138/112 |
| 3,757,031 | 9/1973 | Izraeli | 138/162 |
| 3,809,350 | 5/1974 | Lane | 138/106 |
| 3,914,100 | 10/1975 | Guskea | 138/158 |
| 4,003,407 | 1/1977 | Finger | 138/178 |
| 4,080,184 | 3/1978 | Petersen | 138/106 |
| 4,095,041 | 6/1978 | Netzel et al. | 138/114 |
| 4,482,267 | 11/1984 | Widerby | 138/96 R |
| 4,878,821 | 11/1989 | Huether et al. | 138/158 |
| 5,246,345 | 9/1993 | Adams, Jr. | 416/247 |
| 5,337,792 | 8/1994 | Tempel | 138/96 R |

Primary Examiner—James Hook

[57] ABSTRACT

A pipe hole covering and sealing trim for covering and sealing a hole in a wall through which a pipe extends. The pipe hole covering and sealing trim includes an annular piece has inner and outer perimeters, and front and back faces. The inner perimeter of the piece defining a center hole through the piece designed for extending a pipe therethrough. The piece has an inwardly extending resiliently deformable annular gasket along the inner perimeter of the piece designed for forming a seal between the pipe and the piece.

8 Claims, 2 Drawing Sheets

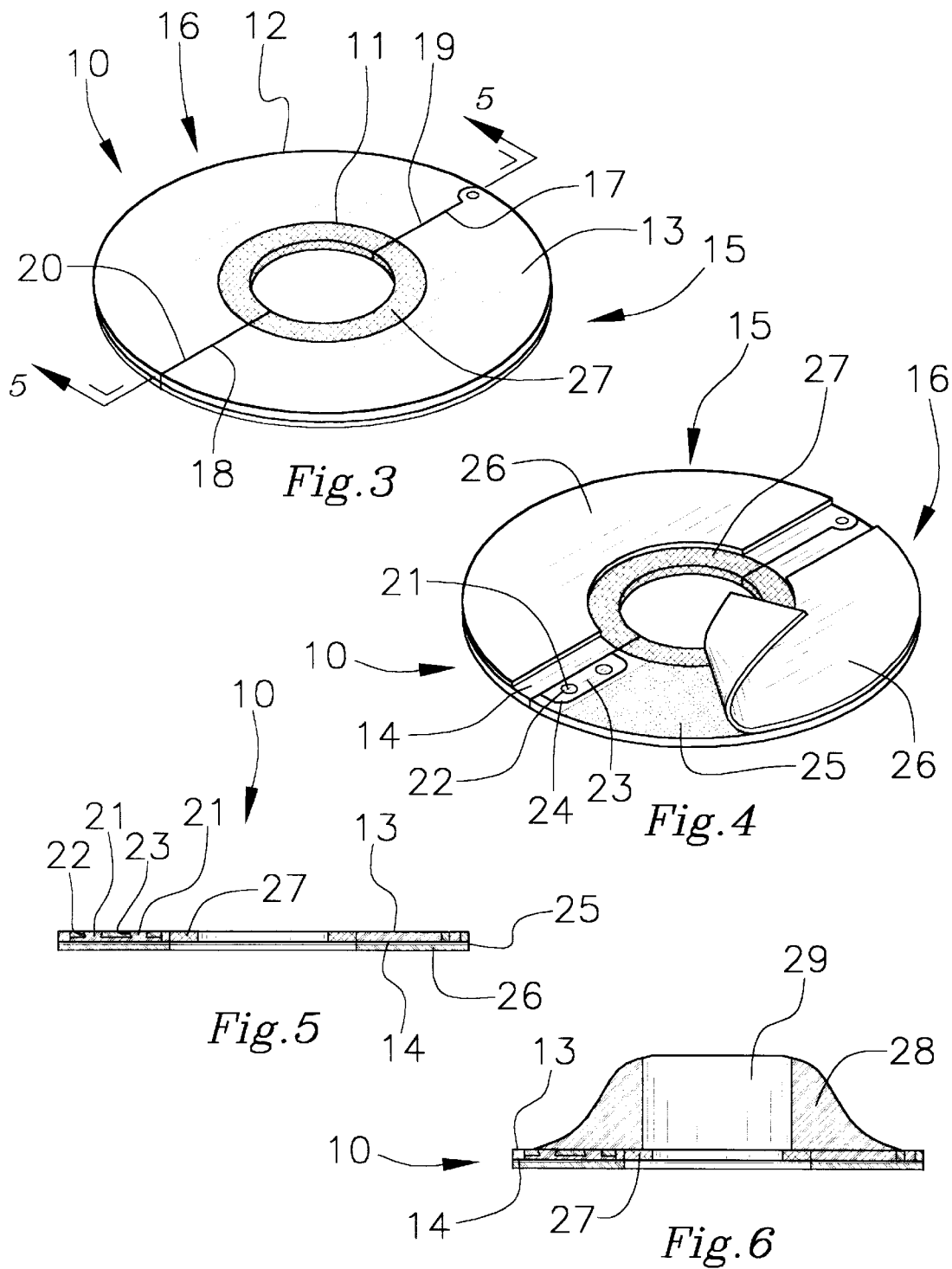

PIPE HOLE COVERING AND SEALING TRIM

BACKGROUND OF THE INVENTION

1. Field of the Invention

The present invention relates to pipe hole covering and sealing trims and more particularly pertains to a new pipe hole covering and sealing trim for covering and sealing a hole in a wall through which a pipe extends.

2. Description of the Prior Art

The use of pipe hole covering and sealing trims is known in the prior art. More specifically, pipe hole covering and sealing trims heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 1,670,241; U.S. Pat. No. 5,337,792; U.S. Pat. No. 2,044,568; U.S. Pat. No. 5,246,345; U.S. Pat. No. 4,777,985; and U.S. Patent No. Des. 264,494.

While these devices fulfill their respective, particular objectives and requirements, the aforementioned patents do not disclose a new pipe hole covering and sealing trim. The inventive device includes an annular piece has inner and outer perimeters, and front and back faces. The inner perimeter of the piece defining a center hole through the piece designed for extending a pipe therethrough. The piece has an inwardly extending resiliently deformable annular gasket along the inner perimeter of the piece designed for forming a seal between the pipe and the piece.

In these respects, the pipe hole covering and sealing trim according to the present invention substantially departs from the conventional concepts and designs of the prior art, and in so doing provides an apparatus primarily developed for the purpose of covering and sealing a hole in a wall through which a pipe extends.

SUMMARY OF THE INVENTION

In view of the foregoing disadvantages inherent in the known types of pipe hole covering and sealing trims now present in the prior art, the present invention provides a new pipe hole covering and sealing trim construction wherein the same can be utilized for covering and sealing a hole in a wall through which a pipe extends.

The general purpose of the present invention, which will be described subsequently in greater detail, is to provide a new pipe hole covering and sealing trim apparatus and method which has many of the advantages of the pipe hole covering and sealing trims mentioned heretofore and many novel features that result in a new pipe hole covering and sealing trim which is not anticipated, rendered obvious, suggested, or even implied by any of the prior art pipe hole covering and sealing trims, either alone or in any combination thereof.

To attain this, the present invention generally comprises an annular piece has inner and outer perimeters, and front and back faces. The inner perimeter of the piece defining a center hole through the piece designed for extending a pipe therethrough. The piece has an inwardly extending resiliently deformable annular gasket along the inner perimeter of the piece designed for forming a seal between the pipe and the piece.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new pipe hole covering and sealing trim apparatus and method which has many of the advantages of the pipe hole covering and sealing trims mentioned heretofore and many novel features that result in a new pipe hole covering and sealing trim which is not anticipated, rendered obvious, suggested, or even implied by any of the prior art pipe hole covering and sealing trims, either alone or in any combination thereof.

It is another object of the present invention to provide a new pipe hole covering and sealing trim which may be easily and efficiently manufactured and marketed.

It is a further object of the present invention to provide a new pipe hole covering and sealing trim which is of a durable and reliable construction.

An even further object of the present invention is to provide a new pipe hole covering and sealing trim which is susceptible of a low cost of manufacture with regard to both materials and labor, and which accordingly is then susceptible of low prices of sale to the consuming public, thereby making such pipe hole covering and sealing trim economically available to the buying public.

Still yet another object of the present invention is to provide a new pipe hole covering and sealing trim which provides in the apparatuses and methods of the prior art some of the advantages thereof, while simultaneously overcoming some of the disadvantages normally associated therewith.

Still another object of the present invention is to provide a new pipe hole covering and sealing trim for covering and sealing a hole in a wall through which a pipe extends.

Yet another object of the present invention is to provide a new pipe hole covering and sealing trim which includes an annular piece has inner and outer perimeters, and front and back faces. The inner perimeter of the piece defining a center hole through the piece designed for extending a pipe therethrough. The piece has an inwardly extending resiliently deformable annular gasket along the inner perimeter of the piece designed for forming a seal between the pipe and the piece.

Still yet another object of the present invention is to provide a new pipe hole covering and sealing trim that fits around a pipe to cover and seal the hole in the wall to hide the hole and to help prevent moisture from passing between the pipe and the periphery of the hole.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic front perspective view of the present invention with the portions pivoted together.

FIG. 4 is a schematic back perspective view of the present invention.

FIG. 5 is a schematic cross sectional view of the present invention taken from line 5—5 of FIG. 3.

FIG. 6 is a schematic cross sectional view of an optional embodiment of the present invention.

DESCRIPTION OF THE PREFERRED EMBODIMENT

With reference now to the drawings, and in particular to FIGS. 1 through 6 thereof, a new pipe hole covering and sealing trim embodying the principles and concepts of the present invention will be described.

As best illustrated in FIGS. 1 through 6, the pipe hole covering and sealing trim generally comprises an annular piece has inner and outer perimeters, and front and back faces. The inner perimeter of the piece defining a center hole through the piece designed for extending a pipe therethrough. The piece has an inwardly extending resiliently deformable annular gasket along the inner perimeter of the piece designed for forming a seal between the pipe and the piece.

Figure 1:
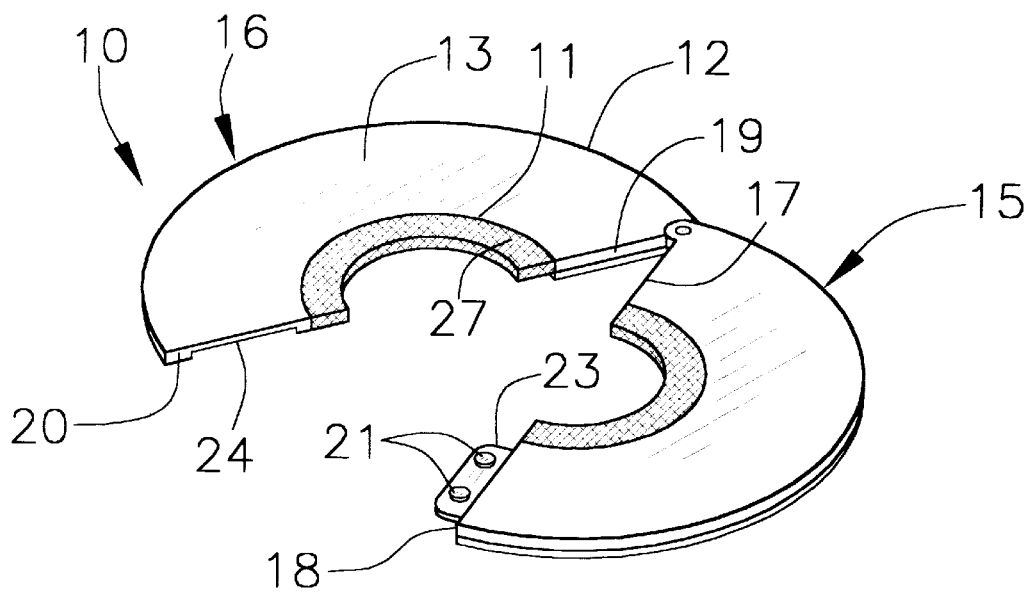
FIG. 1 is a schematic front perspective view of a new pipe hole covering and sealing trim with the portions of the piece pivoted apart according to the present invention.
Figure 2:
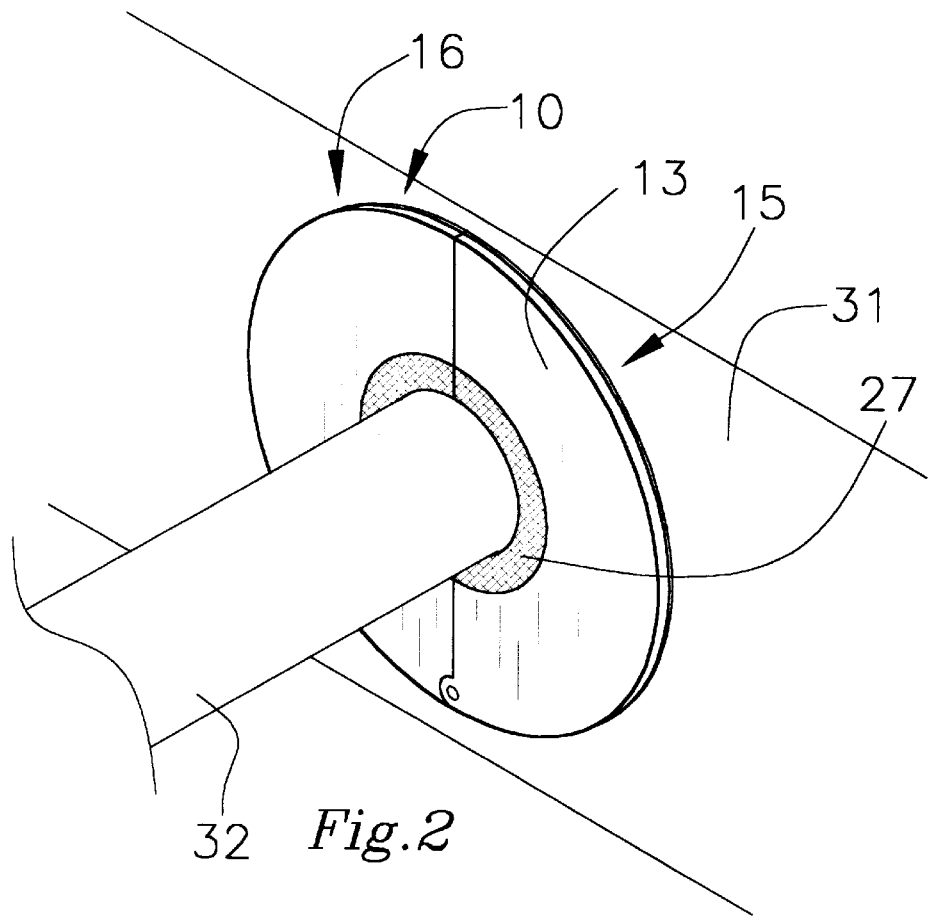
FIG. 2 is a schematic front perspective view of the present invention in use around a pipe.

In closer detail, the pipe hole covering and sealing trim comprises an annular trim piece 10 having generally circular concentric inner and outer perimeters 11,12, and ring-shaped substantially planar front and back faces 13,14. The piece ideally comprises a waterproof vinyl material for preventing water from passing through the piece. The inner perimeter of the piece defines a generally circular center hole which is designed for extending a generally cylindrical pipe therethrough as illustrated in FIG. 2. In an ideal illustrative embodiment, the piece has an outer diameter defined across the outer perimeter of the piece of about 2¾ inches and a thickness defined between the front and back faces of the piece of about ⅛ inch.

Preferably, the piece is divided in half to form a pair of separable generally semi-circular portions 15,16 each having corresponding portion of the inner and outer perimeters of the piece and corresponding portion of the front and back faces of the piece. Each of the portions of the piece has a pair of opposite ends 17,18,19,20. A first end 17 of the pair of ends of one of the portions of the piece is pivotally coupled to a first end 19 of the pair of ends of the other of the portions of the piece adjacent the outer perimeter of the piece (by either a hinge pin—as illustrated in the Figures or by a living binge integrally coupling the first ends together).

A second end 18 of the pair of ends of one of the portions of the piece is detachably coupled to a second end 20 of the pair of ends of the other of the portions of the piece when the portions of the piece are pivoted to a closed position where the piece is ring shaped. Preferably, a snap fastener detachably couples the second ends of the portions of the piece together. As best illustrated in FIGS. 1, 3, 5 and 6, the snap fastener comprises a spaced pair of resilient generally frusta-conical snap extents 21 and a corresponding spaced apart pair of generally circular receiving holes 22 into which the snap extents are inserted to couple the portions of the piece together. The snap extents of the snap fastener is located on one of the portions of the piece and the receiving holes of the snap fastener is located on the other of the portions of the piece.

Ideally, the second end of one of the portions of the piece has a tab 23 outwardly extending therefrom. The tab lies in a common plane with the back face of the piece. The snap extents of the snap fastener are located on the tab. The second end of the other of the portions of the piece has a recess 24 there adjacent in the back face of the piece. The receiving holes of the snap fastener are located in the recess. The tab is inserted into the recess so that the snap extents are inserted into the receiving holes.

In use, the back face of the piece is designed for abutting against a wall surface adjacently around the pipe extended through the center hole. Each of the portions of the piece has an adhesive 25 on the back face of the piece for adhesively coupling the back face of the piece to the wall structure. Preferably, each of the portions has a generally semi-circular C-shaped peelably removable protective backing sheet 26 substantially covering the adhesive. The protective backing sheet is designed for removing prior to adhesively coupling the adhesive to the wall structure.

The piece has an inwardly extending resiliently deformable annular gasket 27 along the inner perimeter of the piece. Each of the portions of the piece has a generally semi-circular corresponding portion of the annular gasket. The annular gasket preferably comprises a resiliently deformable foamed material such as a resiliently deformable plastic or rubber material that is waterproof to prevent passage of water therethrough. In use, the annular gasket is designed for extending around the pipe such that the annular gasket forms a seal between the pipe and the inner perimeter of the piece.

Optionally, with reference to FIG. 6, the back face of the piece may have an annular back extent 28 outwardly extending therefrom adjacent the inner perimeter of the piece. The back extent has a generally cylindrical inner surface 29 defining a central bore coaxial with the center hole of the piece. The inner surface of the back extent is positioned between the inner perimeter of the piece and an inner periphery of the annular gasket. The back extent also has an outer surface 30 forming a portion of the back face of the piece. The adhesive of the piece is also provided on the outer surface of the piece. In use, the back extent is designed for inserting into the hole in the wall structure, the central bore of the back extent is designed for extending the pipe therethrough.

In use, the trim is designed for use covering a hole in a wall structure 31 from which a generally cylindrical pipe 32 is outwardly extended. As illustrated in FIG. 2, the piece is disposed around the pipe such that the annular gasket abuts the circumference of the pipe. The back face of the piece abuts the wall structure such that the piece covers an outer periphery of the hole of the wall structure. The adhesive adhesively couples the back face of the piece to the wall structure. In the optional embodiment illustrated in FIG. 6, the back extent is extended into the hole of the wall structure.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A trim, comprising:
   an annular piece having inner and outer perimeters, and front and back faces;
   said inner perimeter of said piece defining a center hole through said piece adapted for extending a pipe therethrough;
   said piece having an inwardly extending resiliently deformable annular gasket along said inner perimeter of said piece;
   wherein said piece comprises a pair of separable generally semi-circular portions, each of said portions of said piece having a pair of opposite ends, wherein a first end of said pair of ends of one of said portions of said piece is pivotally coupled to a first end of said pair of ends of the other of said portions of said piece adjacent said outer perimeter of said piece;
   wherein a second end of said pair of ends of one of said portions of said piece is detachably coupled to a second end of said pair of ends of the other of said portions of said piece; and
   wherein a snap fastener detachably couples said second ends of said portions of said piece together.

2. The trim of claim 1, wherein said snap fastener comprises a spaced pair of resilient generally frusta-conical snap extents and a corresponding spaced apart pair of generally circular receiving holes into which said snap extents are inserted to couple said portions of said piece together.

3. The trim of claim 2, wherein said snap extents of said snap fastener are located on one of said portions of said piece, and wherein said receiving holes of said snap fastener are located on the other of said portions of said piece.

4. The trim of claim 1, wherein said back face of said piece has an adhesive thereon.

5. A trim system, comprising:
   an annular piece having generally circular concentric inner and outer perimeters, and ring-shaped substantially planar front and back faces;
   said inner perimeter of said piece defining a generally circular center hole through said piece;
   said piece comprising a pair of separable generally semi-circular portions;
   each of said portions of said piece having a pair of opposite ends;
   a first end of said pair of ends of one of said portions of said piece being pivotally coupled to a first end of said pair of ends of the other of said portions of said piece adjacent said outer perimeter of said piece;
   a second end of said pair of ends of one of said portions of said piece being detachably coupled to a second end of said pair of ends of the other of said portions of said piece;
   wherein a snap fastener detachably couples said second ends of said portions of said piece together;
   said snap fastener comprising a spaced pair of resilient generally frusta-conical snap extents and a corresponding spaced apart pair of generally circular receiving holes into which said snap extents are inserted to couple said portions of said piece together;
   said snap extents of said snap fastener being located on one of said portions of said piece, said receiving holes of said snap fastener being located on the other of said portions of said piece;
   each of said portions of said piece having an adhesive on said back face of said piece;
   said piece having an inwardly extending resiliently deformable annular gasket along said inner perimeter of said piece;
   a wall structure having a generally circular hole therein;
   a generally cylindrical pipe being outwardly extended from said hole of said wall structure; and
   said piece being disposed around said pipe such that said annular gasket abuts said pipe, said back face of said piece abutting said wall structure such that said piece covers an outer periphery of said hole of said wall structure, said adhesive adhesively coupling said back face of said piece to said wall structure.

6. A trim, comprising:
   an annular piece having inner and outer perimeters, and front and back faces;
   said inner perimeter of said piece defining a center hole through said piece adapted for extending a pipe therethrough;
   said piece having an inwardly extending resiliently deformable annular gasket along said inner perimeter of said piece; and
   wherein said back face of said piece has an adhesive thereon.

7. The trim of claim 6, wherein said piece comprises a pair of separable generally semi-circular portions, each of said portions of said piece having a pair of opposite ends, wherein a first end of said pair of ends of one of said portions of said piece is pivotally coupled to a first end of said pair of ends of the other of said portions of said piece adjacent said outer perimeter of said piece.

8. The trim of claim 7, wherein a second end of said pair of ends of one of said portions of said piece is detachably coupled to a second end of said pair of ends of the other of said portions of said piece.

* * * * *